Sept. 8, 1959  R. D. HUNTOON  2,903,593
DOSIMETER
Filed July 19, 1957

INVENTOR
Robert D. Huntoon
BY Arthur Vinograd
Leonard F. Stoll  ATTORNEYS

United States Patent Office 2,903,593
Patented Sept. 8, 1959

2,903,593
DOSIMETER

Robert D. Huntoon, Kensington, Md., assignor to the United States of America as represented by the Secretary of Commerce Application July 19, 1957, Serial No. 673,101

5 Claims. (Cl. 250—83.3)

This invention is concerned with an electrometer type dosimeter and more particularly with a continuously active pocket dosimeter useful for civil defense and other purposes.

It is desirable for civil defense purposes to have a dosimeter which can be left in a fixed position, permanently connected to power mains, and continuously charged. The dosimeter of the present invention is constructed so that it can be active at all times and will record radiation dosage following an attack. Since it is natural to assume that the power supply may completely fail or only intermittently operate after a radiation attack, the dosimeter of the present invention incorporates the feature of being capable of recording radiation dosage even under such extreme conditions. In short the present invention provides a novel radiation dosimeter which is capable of maintaining a continuous charge from conventional power mains and also capable of remaining fully charged over extended periods of power failure.

One object of the present invention is to provide an electrometer type dosimeter which remains continuously charged from conventional power supply mains.

Another object of the present invention is to provide a dosimeter capable of operation over extended periods of power supply failure.

A further object of the present invention is to provide a dosimeter for civil defense purposes which will record radiation dosage following a nuclear or thermionic attack.

A still further object of this invention is to provide a dosimeter which will give correct readings even if the power supply should be intermittently on or off in the period following a radiation attack.

Figure 1:
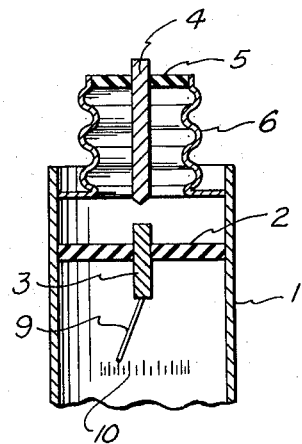
Figure 2:
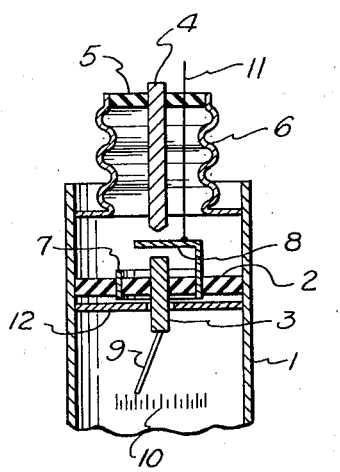

Other uses and advantages of the invention will become apparent upon reference to the specification and drawings in which Fig. 1 shows a schematic representation of a conventional dosimeter of the prior art, and Fig. 2 shows the improved dosimeter of the present invention.

Referring to the drawings, Fig. 1 is a schematic representation of a conventional dosimeter including a metal shell 1 containing a dielectric element 2 which supports a metal rod 3. Attached to metal rod 3 is a small quartz indicating fiber 9. The displacement of fiber 9 as displayed on an optical scale 10 indicates the amount of dosage. The charging mechanism of the dosimeter of the prior art shown in Fig. 1 consists of a metal charging post 4 supported by a dielectric cap member 5 which is in turn anchored to a flexible metal bellows 6.

To charge the conventional electrometer, metal post 4 is connected to a source of high voltage in a charging box (not shown) and bellows 6 is compressed until post 4 makes an electrical connection to rod 3, thereby charging the electrometer. Release of the bellows 6 breaks the connection between post 4 and rod 3 and leaves the electrometer charged and isolated. This charge can leak out through dielectric 2 which has its surface protected by virtue of the shield provided in the region enclosed by metal bellows 6 and dielectric 5. Alternatively the charge can leak off from the electrometer by ionization of the air in the metal container 1. In a properly designed instrument the ionization leakage will be greater than the leakage through the dielectric 2 for radiations which the instrument is designed to measure. Normally, after charging as described above, the leakage across the dielectric 2 is such that the instrument makes reasonably correct measurements for a period of several days following the charging.

Fig. 2 shows the improved dosimeter of the present invention incorporating the modifications required to achieve the purposes outlined in the objects of the invention listed above. Elements 1, 2, 3, 4, 5, 6, 9, and 10 refer to the corresponding elements in Fig. 1. An additional element 7 in the form of a conducting ring is placed in the dielectric 2 and surrounds the center rod 3. Element 7 is electrically insulated from the metal case 1 and from the rod 3. In addition ring element 7 is connected to a flexible metal vane 8 and a connecting wire 11 which goes through the dielectric plate 5. A guard plate 12 is attached to the frame 1 but isolated by a small air gap from elements 3, 2, and 7 as shown so that ionization charges developed in the chamber of metal shell 1 are collected on rod 3 rather than being collected on ring 7. The guard plate 12 is electrically connected to case 1 but does not touch the dielectric 2, the ring 7, or the rod 3.

In operation the connecting wire 11 is permanently attached to a high-voltage supply (not shown) of sufficient magnitude to charge the electrometer to its zero reading. By compressing the bellows 6, post 4 will position the vane 8 into contact with rod 3, thereby charging the electrometer. Upon release, post 4 breaks away from vane 8 which also breaks away from rod 3, leaving the electrometer charged. This charge can leak off through ionization to give the desired measurements or through dielectric 2, as explained in conjunction with the prior art dosimeter of Fig. 1. However, the potential of ring 7 is continuously maintained at a high voltage so that rod 3 is shielded from shell 1 and there is no potential difference to cause leakage from rod 3 through the dielectric 2. The electrometer stays charged so long as the high voltage is applied to connection 11. Should the electrometer tend to discharge extremely slowly by virtue of a slight background radiation, leakage across the dielectric from ring 7 to rod 3 will keep the electrometer charged. The leakage across the dielectric from ring 7 to rod 3 will be extremely slight; i.e., comparable to that in the conventional instrument described in Fig. 1. Therefore, if radiation should fall on the instrument while the high voltage is applied, it will indicate dosage with as good an accuracy as the conventional meter but with the normal leakage error reversed since the electrometer tends always to drift to zero instead of drifting toward a full scale reading as is conventional. Should the high voltage power fail and drop to zero voltage, the electrometer functions in a conventional manner as described in Fig. 1.

As can be seen, if so desired, the dosimeter of Fig. 2 can be used in a conventional manner by charging in the usual way through center post 4, making no use of the high voltage connection 11. On the other hand, it can be used for power main detection by providing a small high voltage supply permanently connected to the wire 11 and fed from power mains.

If a discharge electrometer of the type provided by the present invention is connected to a high voltage supply through connector 11, and not charged by compression of the bellows 6 as indicated above, the electrometer will in the course of time become charged through the slight leakage from ring 7 to post 3 through the dielectric. The time constant for this process will be so long that ordinary variations of the high voltage supply due to the line voltage variations will be averaged out. In this case the reading of the electrometer will represent the long-time average voltage of the high voltage supply.

It will be apparent that the embodiments shown are only exemplary and that various modifications can be made in construction and arrangement within the scope of invention as defined in the appended claims.

What is claimed is:

1. A continuously active radiation dosimeter comprising a tubular conductive shell defining an ionization chamber, a circular dielectric plate supported by said shell and positioned across the transverse dimension thereof, a conductive rod passing through the center of said dielectric plate and extending beyond both sides of said plate, bellows means including a longitudinally movable metal post for selectively connecting one end of said rod to a charging source, a conducting quartz indicating fiber adjacent said rod, said fiber being electrically connected to said rod, a conductive ring imbedded in said dielectric plate surrounding said rod, means for permanently connecting said ring to a source of electrical potential, and vane means adapted to be actuated by said movable post for coupling said electrical potential source to said rod.

2. A dosimeter as defined in claim 1 including a conductive plate supported by said shell in parallel spaced relation with said dielectric plate.

3. A dosimeter as defined in claim 2 in which said conductive plate is electrically insulated from said rod and said ring.

4. A continuously active radiation dosimeter comprising a conductive shell defining an ionization chamber, a dielectric plate supported by said shell and transversely positioned across the interior thereof, a centrally disposed conductive rod contained in said dielectric plate and projecting from both sides thereof, an indicating fiber affixed to one end of said rod, conductive ring means imbedded in said dielectric plate and surrounding said rod, a high potential source connected to said ring and means for selectively connecting said rod to said ring means.

5. The invention of claim 4 including a conductive guard plate connected to said shell and extending into proximity to said rod adjacent said dielectric plate and conductive ring, said guard plate having a central opening through which a portion of said conductive rod projects into said ionization chamber, the remainder of said guard plate shielding said conductive ring from said ionization chamber.

References Cited in the file of this patent

UNITED STATES PATENTS

| | | |
|---|---|---|
| 2,499,489 | Goldstein | Mar. 7, 1950 |
| 2,753,463 | Stout et al. | July 3, 1956 |
| 2,761,073 | Carlbom et al. | Aug. 28, 1956 |